United States Patent [19]

Chenin et al.

[11] 4,426,053

[45] Jan. 17, 1984

[54] MECHANICAL RELEASE DEVICE FOR EXAMPLE FOR SATELLITE

[75] Inventors: Claude Chenin; Rodolphe Krawczyk, both of Cannes la Bocca; Georges Marello, Mandelieu; Jean-Yves Lombard, Le Cannet, all of France

[73] Assignee: Societe Nationale Industrielle Aerospatiale, France

[21] Appl. No.: 354,256

[22] Filed: Mar. 2, 1982

[30] Foreign Application Priority Data

Mar. 3, 1981 [FR] France ................................ 81 04195

[51] Int. Cl.³ .............................................. B64G 1/44
[52] U.S. Cl. .................................... 244/173; 292/28; 220/315; 220/359
[58] Field of Search ................ 136/245, 292; 206/403, 206/404, 405, 406, 616, 622, 220, 244, 441, 428; 220/246, 315, 324, 326, 359; 244/147, 148, 149, 173; 292/28, 24, 25, 129, 253, 254, 288; 52/DIG. 13; 428/100; 441/7, 9, 42

[56] References Cited

U.S. PATENT DOCUMENTS

| 1,610,320 | 7/1923 | Redemski | 292/253 |
| 2,762,589 | 9/1956 | Frieder et al. | 244/148 |
| 3,516,852 | 6/1970 | Janssen et al. | 220/359 |
| 3,690,605 | 9/1972 | Jones | 244/149 |
| 3,696,472 | 10/1972 | Perina et al. | 52/DIG. 13 |
| 4,034,940 | 7/1977 | Bird | 244/148 |

FOREIGN PATENT DOCUMENTS

| 108721 | 3/1966 | Norway | 441/42 |
| 1142679 | 2/1969 | United Kingdom | 441/42 |
| 1181980 | 2/1970 | United Kingdom | 441/42 |

Primary Examiner—Trygve M. Blix
Assistant Examiner—Rodney Corl
Attorney, Agent, or Firm—Karl W. Flocks; Sheridan Neimark; A. Fred Starobin

[57] ABSTRACT

A mechanical release device for releasing a member with respect to another. The device comprises a bonding element disposed on each of the members to be released, a flexible junction element placed on the bonding elements and a device permitting under the action of a mechanism the progressive raising of said flexible element and then the release of the members secured to one another. The invention preferably relates to the displaying of solar panels for a satellite in a space environment.

6 Claims, 14 Drawing Figures

MECHANICAL RELEASE DEVICE FOR EXAMPLE FOR SATELLITE

This invention relates to mechanical devices used in particular on satellites.

It relates more especially to mechanical release of a member with respect to another in a vacuum and temperature spatial environment.

It relates more particularly to solar panel containers to be opened after putting the carrier satellite into orbit.

Different devices are well known, realizing an equivalent function in particular by means of pawls and cams.

In such a solution, a container for a satellite solar generator in a box configuration with cover and hinge means carries pawls on the box side and cams on the cover side, and the tipping over of the cams caused by any kind of action provokes a movement of the pawls thereby releasing the cover which then opens by pivoting about the hinge means under the effect of a suitable mechanism.

Such a device has the major disadvantage of transmitting only very low shear fluxes which are often incompatible with stresses imposed upon in certain phases of the positioning of a satellite.

Another, pyrotechnical solution is disadvantageous because it produces a shock at the time of release of the cover.

A third solution providing for a sliding pin implies jamming risks due to residual deformations of the container and in any case the mass is a redhibitory defect for utilization in space.

This invention has none of the above-mentioned disadvantages.

The main object of this invention consists of temporarily connecting two structural members when the connection, for one thing, endures significant shearing fluxes. For obvious reasons of reduction of the load it is important to distribute the shearing flux as much as possible continuously. In the application according to the invention to the connection of a container to its cover, said container is partly in a cantilevered position. Consequently, the mechanical and dynamic stresses to which it is submitted produce bending moments and therefore large shearing fluxes between the walls of the container and its cover.

Furthermore, the connection of the container to its cover may be submitted to tractive stresses due to forces produced by a bladder disposed within said container and adapted to hold in place mechanical elements contained therein, inspite of strains to be resisted by the assembly, especially during the launching phase.

In such an application, the above-mentioned mechanical elements are the constituents of a solar panel to be used on a satellite.

Finally, the connection must also transmit a flux normal to said connection, and so that no delamination should occur due to such strain, there is provided a mechanical fitting in to be described hereinafter.

The proposed solution permits to ensure successively:
in a first period, the transfer of the high shearing flux and the tractive forces mentioned above, which occur between the container and its cover;

and, in a second period, the mechanical release of one side of the cover, with the other edge of said cover remaining connected to the container by hinge means distributed all along its length.

The device according to the invention is substantially realized by means of a flexible blade welded or glued flat, with one half of its length being connected to the container and the other to the cover.

Mechanical release of two members assembled by means of such a connection is obtained by a tractive force exerted upon a free end of the flexible blade and applied in the reversed direction with respect to said end so as to cause the connection product to be peeled off, said product being a welding or glueing material or any other known adhesive.

The tractive force causing the peeling off is produced by the action of a motive member which acts through an element for coordinating the tearing off movement of the different zones of connection.

The motive member can be a spring, an electric motor or the like. The coordination element can be a cable, a strap or any other equivalent device. In the case of a spring, the working command can be produced by a wire cutter to cut off the end of the coordination element adjacent its anchoring point.

The cable can be advantageously replaced in certain cases by a metallic strap.

The mechanical release consists of separating a flexible blade; it can therefore also be effected by making a metallic roll slide under the raised end of said blade. Experience has shown that the force to be provided is substantially twice that necessary in the first solution but since the path of the motive means is reduced by half, one notes that the peeling off is produced by a substantially equal energy. The member which produces the peeling (a wedge or roll) is drawn by the coordinating element, however through bracket means.

Such an arrangement is advantageous in that it is less sensitive to vibrations from the coordination cable.

The connection product or bonding means must be selected so that it provides a suitable shearing strength, since all stresses exerted on the connection are transmitted to the blade by strains of this type. The bonding agent must have a suitable behaviour at such exteme temperatures as are met in a spatial environment, a suitable lasting stability, and present minimum degassing to prevent pollution of optical elements, for example, solar cells disposed nearby. The bonding agent must also be capable of peeling in relation to the blade or the plates of the container, and of its cover. Such properties depend on the materials used and their surface state. Conclusive tests have been effected with cupric plates, a blade of cupro-beryllium and a tin based weld.

Several sorts of connections are possible depending on the amplitude of the shearing flux to be transmitted. There can be considered the following:
slidable connections of the zip fastener type;
connections of the "Velcro" type;
glues;
solderings or brazings;
magnetic elements . . .
and more generally, any adhesive means of the known type.

When the fluxes are not very high, there can be provided a continuity of several tens in percentage, thereby permitting to dispose a cable guide between each of the connections to limit any cable deviation elongations that might untimely initiate the peeling.

When the shearing fluxes of the connections are high there might be necessary to provide continuity of about 100%. Then, the coordination system might have to be modified to increase tension in the cable, since it is then no longer possible to use cable guiding means. Such an arrangement which permits to increase the deflection frequency of the cable and to reduce the elongation thereof can consist of a cable having a strainer passing on two pulleys mounted to the end of the device, said strainer being associated with the tension spring and the cable cutter, which causes functioning of the release. A gutter in form of a guiding means can also be associated therewith.

This invention responds to requirements corresponding to certain types of application that other solutions cannot satisfy without extensive modifications thereto which would then imply prohibitive masses.

This invention will be better understood in the light of the following description of several preferred forms of embodiment of the invention to be applied to the space field and illustrated in an exemplifying manner by means of the attached drawings on which.

Figure 1:
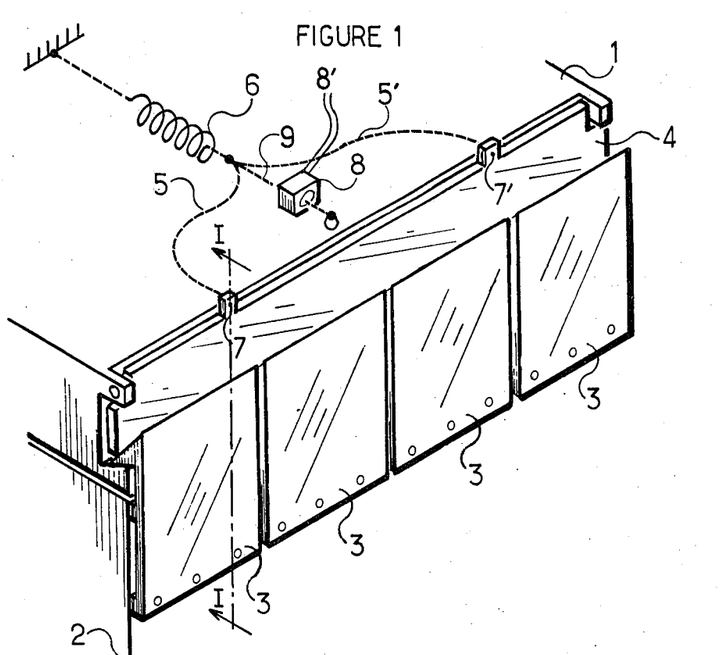
FIG. 1 is a schematic perspective view showing a known type of container opening device.
Figure 2:
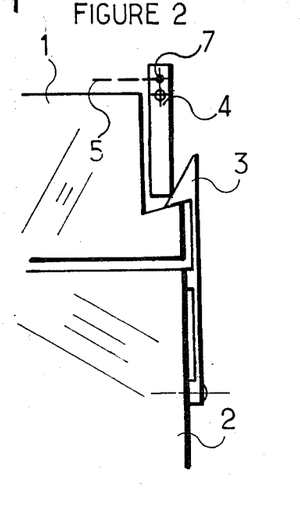
FIGS. 2 and 3 are cross-sectional views along line I—I of FIG. 1 of the device in the locked and unlocked positions.
Figure 3:
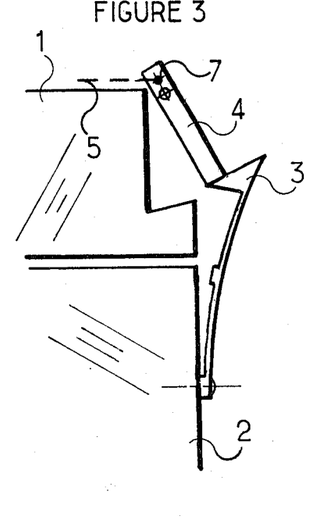

With reference to FIGS. 1, 2 and 3, a container for solar generator of the priorly known art is described hereinafter. In such a solution, the cover 1 of the container 2 is maintained in the closed position by a series of pawls 3. Initiation of the opening is caused to occur by means of a cam 4 disposed all along the connection thereby permitting simultaneous brushing aside of all the pawls through rotation of the cam. The cam is actuated by a spring 6 which produces a tractive force upon two cables 5 and 5' which pull on two levers 7 and 7' integral with said cam 4. The command from the electric control unit 8' acts upon a cable cutter 8 which cuts off the retaining cable 9 biased by spring 6. It is to be noted that the distribution of the securement points on the container is such that practically no shearing flux is transmitted from the container to its cover and that only a few positioning pawns are needed.

As explained above, such a solution is not suitable for permitting passage of a large shearing flux for the lack of longitudinal securement of the cover to the other part of the container.

In the solution proposed by the invention, not only the transmitted flux can be high, but also the release of the container cover can be effected much more simply if only for the absence of pivotable mechanism that might be put out of order by jamming or the elimination of pieces working by bending such as the locking pawls.

Figure 4:
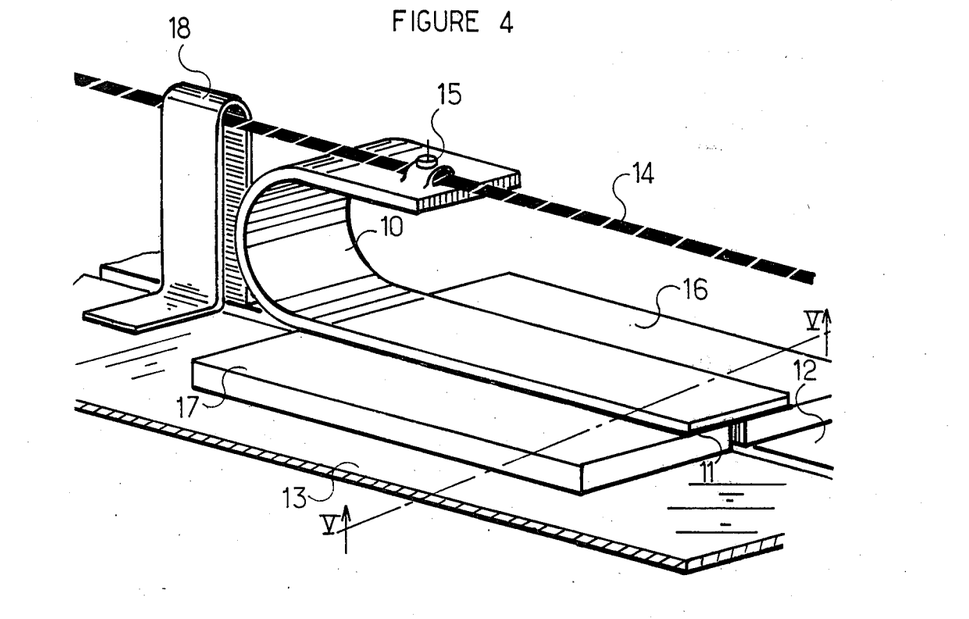
FIG. 4 is a perspective view showing the basic concept of the operation of the device according to the invention.
Figure 5:
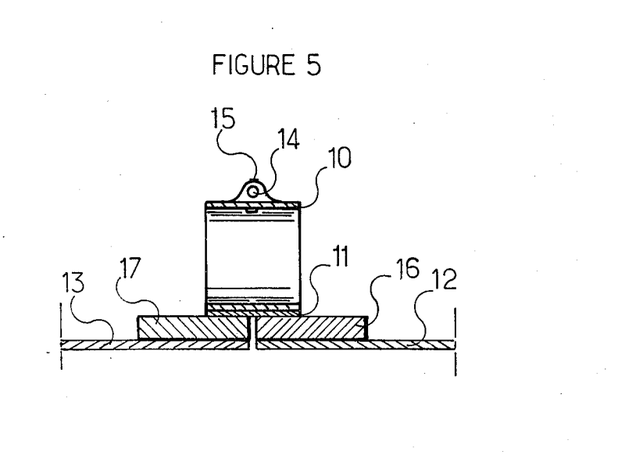
FIG. 5 is a cross-sectional view along line V—V of FIG. 4.

With reference now to FIGS. 4 and 5, it can be seen that the basic concept of the device according to the invention is substantially developed by using a flexible blade or element 10 connected by adhesive means or bonding elements 11 disposed at the edge of the portion 16, on the one hand, and on the other hand, at the edge of the portion denoted by 17, in said figures, while a cable 14 connected at 15 to the blade 10 provides for the mechanical motion of peeling proper.

The assembling of the flexible blade 10 with the special intermediary members or plates 16, 17 is realized separately.

Such assemblies are thereafter rigidly brought against the elements 12 and 13 of the actual structure.

Moreover, a cable guiding bracket 18 can also be provided additionally.

In the spatial applications to be considered, the flexible blade 10 is preferably made of cupro-beryllium, the plates 16-17 secured to the portions 12 and 13 being of a copper alloy, whereas the connecting product 11 used is of tin base and the cable 14 is made of steel.

Figure 6:
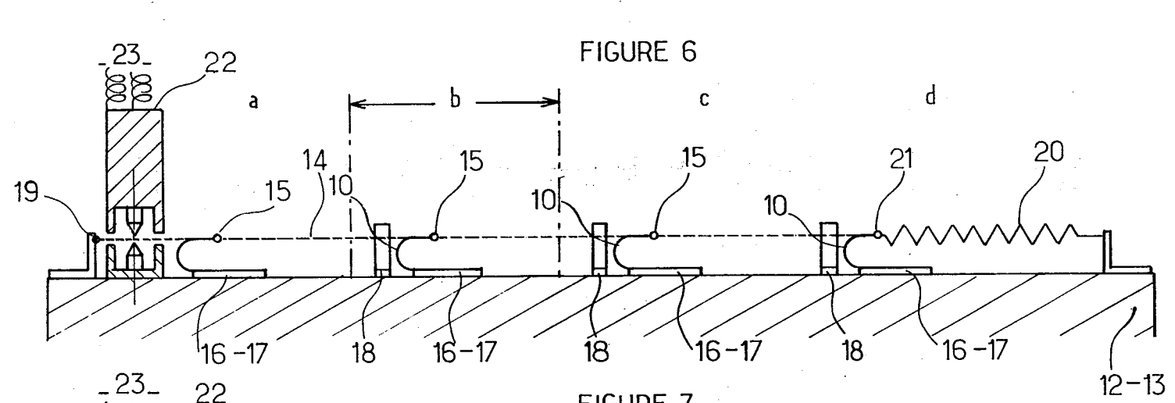
FIG. 6 is a schematic view in longitudinal cross-section showing the application of the invention to a container before starting operation of the device.
Figure 7:
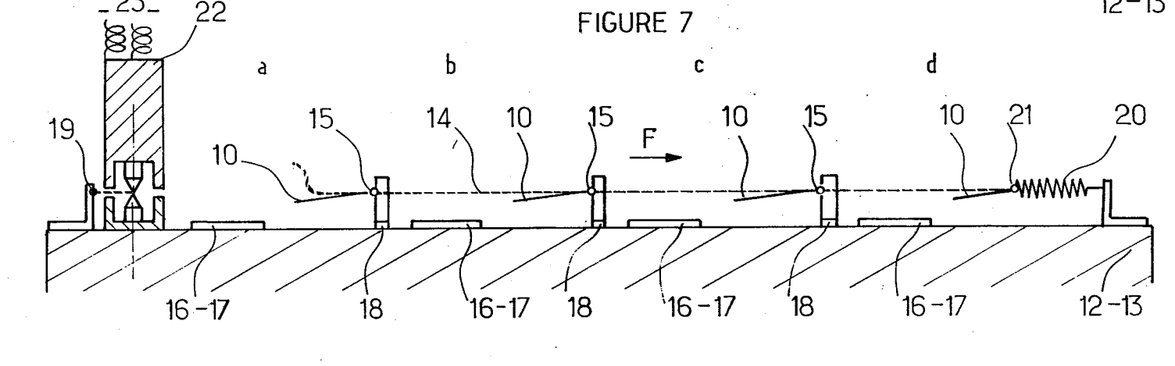
FIG. 7 is a schematic cross-sectional view showing the application of the invention to the same container after operation of the device.

In FIGS. 6 and 7, there is shown schematically how the elementary device of FIGS. 4 and 5 is applied in its entirety (FIG. 4 represents portion b of FIG. 6). With reference to these figures, the cable 14 is attached by its end 19 to a point integral with the container 13, on the one hand, and on the other hand, by its end 21 to a spring 20 itself connected through its other end to the container 13.

A cable cutter 22 electrically controlled through conductors 23 provides for the cutting of cable 14 thereby initiating the opening of the container.

At the time of cutting the cable 14, the biasing force of spring 20 acts upon the cable 14 in the direction of the arrow F in such a way as to produce by an action upon the flexible blades 10 the peeling off of the bonding agent 11 to thereby release the members 12 and 13 as shown in FIG. 7.

It is to be noted that the cable maintained by the cable guides 18 so that in the weightlessness conditions no element may move apart to cause perturbations in the operation of the rest of the satellite.

The portions a, b, c, d shown in FIGS. 6 and 7 may interest a certain connection zone between 12 and 13.

This configuration is applied when the covering is lower than 50% because a sufficient space must be available to ensure the peeling off along all the length of the rod. The portions can then be relatively spaced.

When the connection must be continuous so as to come close to 100%, the covering can be provided as will be exposed hereinafter.

Figures 8, 9:
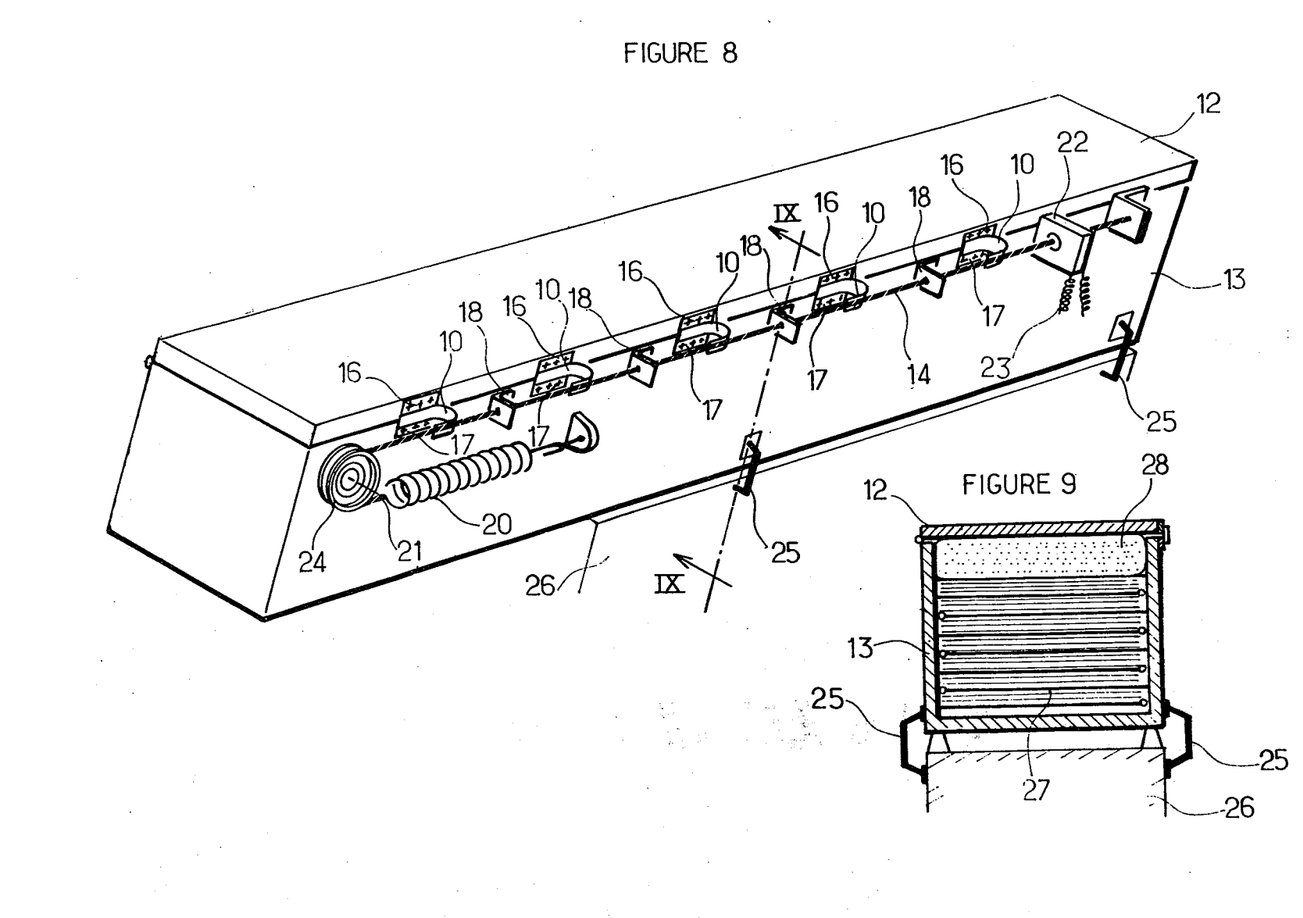
FIG. 8 is a perspective view showing the actual fitting of the device to a container secured to the body of a satellite.
FIG. 9 is a cross-sectional view according to line IX—IX of FIG. 8 to show the container.
Figure 10:
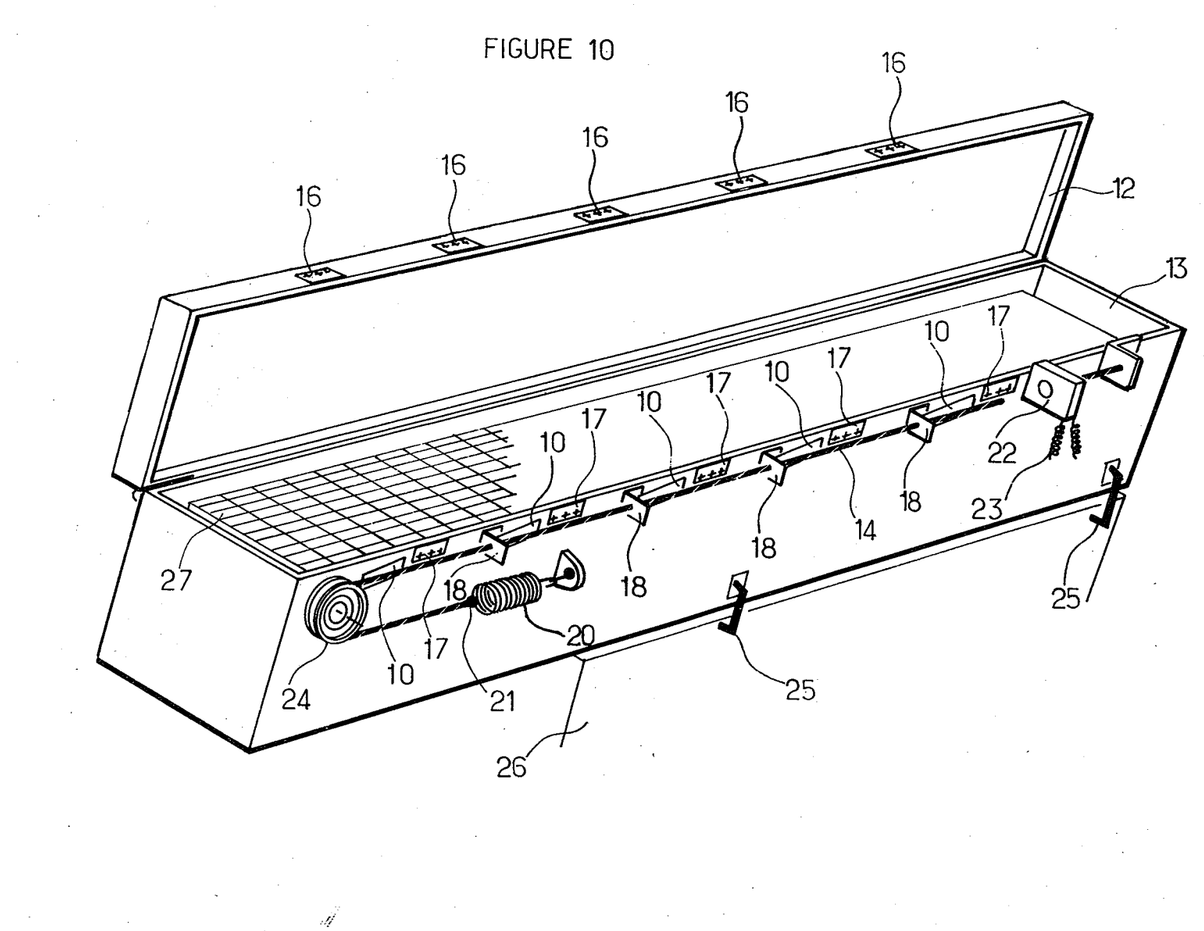
FIG. 10 is a perspective view showing the container after opening the cover but before displaying the solar panels.

FIGS. 8, 9 and 10 show the application to the space of the device according to the invention in order to release a solar panel having accordion pleats on a satellite.

FIG. 8 shows the essential elements of FIGS. 4, 6 and 7, however in a configuration practically usable aboard a satellite. For reasons of distribution of the connections between the container and the cover thereof, the spring 20 lies under the active part of cable 14 upon which it acts through a return pulley 24.

The container 13 is connected on one side to the satellite 26 by means of lugs 25.

FIG. 9 shows the solar generator 27 in the folded position and the bladder 28 for maintaining the generator in the not displayed configuration.

FIG. 10 shows the container assembly of FIG. 8 after opening thereof.

There can be seen that the cable cutter 22 has worked since the cable is cut and has moved by the force of the spring 20, which has then a reduced extension. The blades 10 have been torn off the plates upon peeling the bonding agent, but remain secured to the cable 14 which is held by cable guides 18. The connection between the plates being removed, the cover 12 opens under the effect of an opening device actuated by a hydraulically regulated spring (not shown) having a fixed point on the container 13. The bladder 28 is emptied before this operation.

Figures 11, 12:
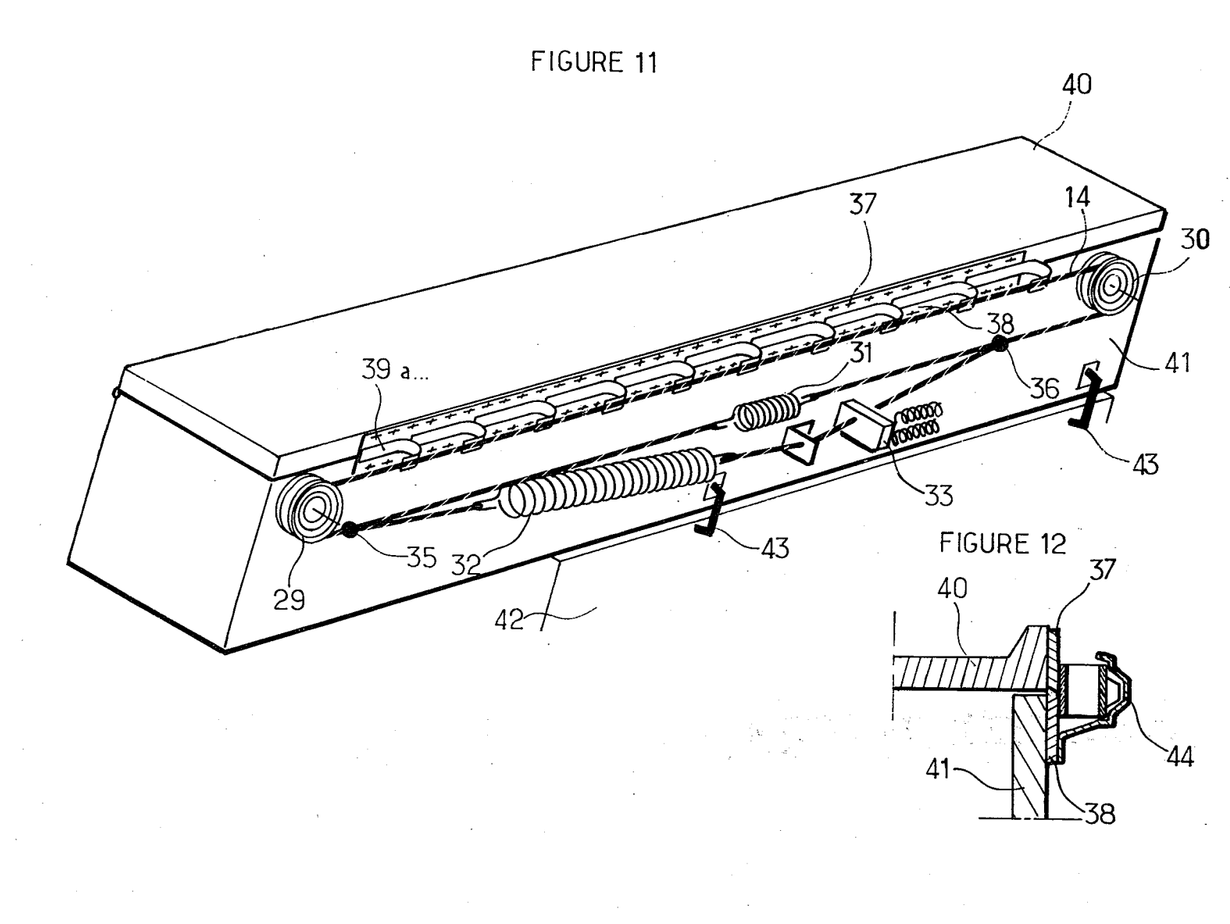
FIG. 11 is a variation of FIG. 8 according to which the covering rate of the peeling device is higher.
FIG. 12 is a sectional view of the junction of the cover to its container, and showing a protective gutter.

FIG. 11 shows a variation of the assembly of a container having a continuous closing approaching 100%. It is to be noted that the cable guides are absent, that the cable 34 is mounted on two pulleys 29 and 30, and that the cable is pulled by a spring 31 to provide for a high resonant frequency thereof. This permits to obtain elongations at the resonance which are compatible with the risks of initiation of the peeling. On this assembly there can be found a tractive spring 32 and a cable cutter 33, which initiates the operation of the device, the connection thereof to the cable 14 being realized at the points 35 and 36.

The covering continuity is provided by the plates 37 and 38 being now continuous, and the flexible blades 39a, 39b . . . producing substantially all the adhesive covering between the cover 40 and the container secured at its turn to the body of the satellite 42 by supports 43.

Additionally, there can be provided a protective gutter 44 as shown in the cross-sectional view of FIG. 12. Such a gutter is mainly used as a guide to limit deflections of the cable undergoing vibrations to thereby prevent accidental initiation of the peeling.

In this figure, there can be noted the slanted cutting of plates 37 and 38 which is done so that the end of the plates 38 is fitted in between the plate 37 and the cover 40. Such an arrangement permits mechanical transmission of forces occurring in a plane parallel to that of the cover. Thus, the risks for peeling caused by this type of shearing stresses can be avoided.

Figure 13:
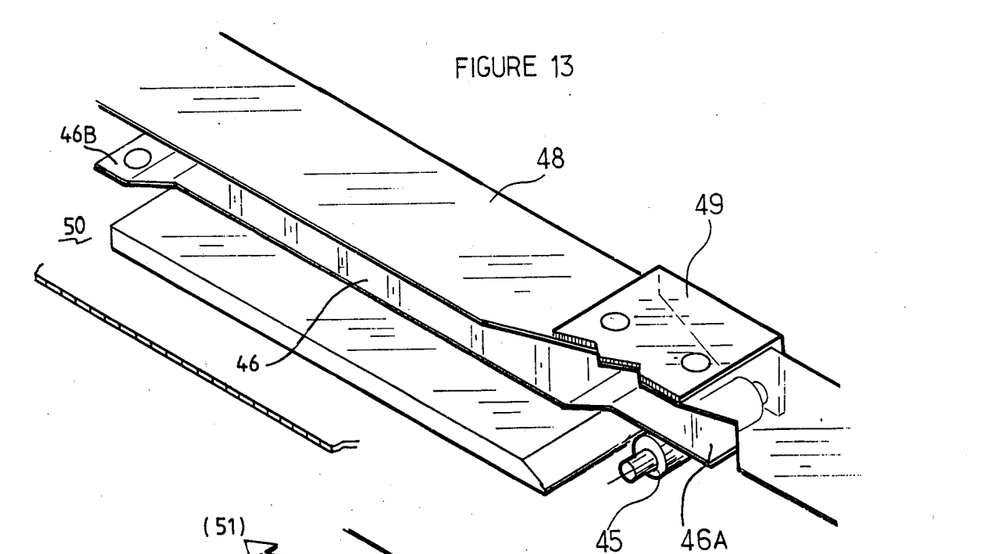
FIG. 13 is a partial perspective view showing a variation of application of the device according to the invention before functioning thereof.
Figure 14:
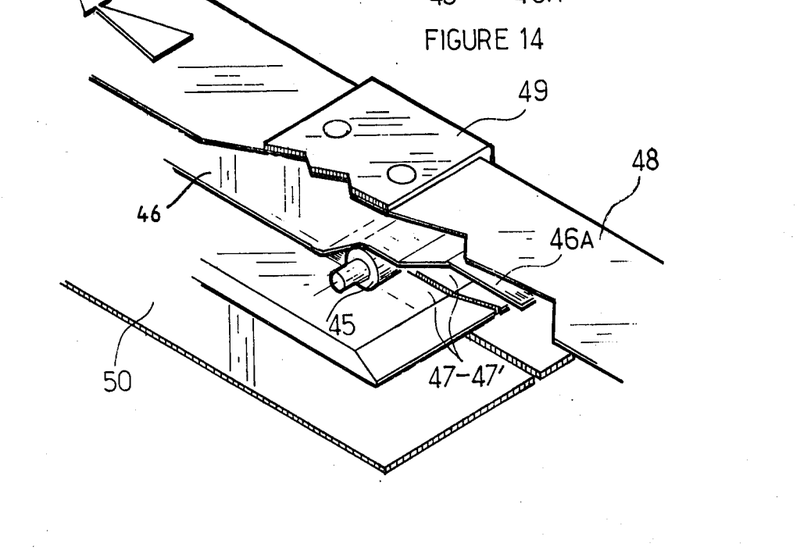
FIG. 14 is a partial perspective view showing the device of FIG. 13 at the beginning of its operation.

FIGS. 13 and 14 show a variation for causing the peeling by means of a roll 45 separating the flexible element 46 from the bonding elements 47 and 47'.

In this case, the cable is replaced by a flat member 48 pulled by a spring 51, said flat member carrying the roll 45 through a bracket 49 and moving such roll, starting from the configuration of FIG. 13 (resting position) along the whole of the length of the flexible element 46, from a tongue portion 46A of such element. The other end 46B of the blade is made integral with that portion of the container 50 which is close to the junction so as to maintain it at the end of its stroke.

The above-described applications of the device according to the invention especially relate to the space field in view of the particular strains encountered there such as vacuum, temperatures, radiations . . . .

It will be understood that the device in accordance with the invention could be applied to other domains than space and it is the case particularly with safety applications, as for example, the prompt liberation of the passengers from a damaged vehicle, in case of casualty when the opening can be effected by pulling the end of a cable accessible from the outside and/or the inside, by means of a handle or ring.

The bonding elements can then be of any type such as fasteners, of the zipper or "Velcro" type, with adhesives such as strap, glue, welding, brazing, or else, magnetic means.

Similarly, the nature of the materials for making the flexible elements, as well as the edge portions for receiving the bonding agent, may be of any suitable type, made of alloy or else as an electrolytically applied coating.

Generally, the object of the invention is a device adapted to permit mechanical release of two portions temporarily secured edgewise to one another and it will be understood that any means that might be used to apply such a device or to adapt the characteristics of this invention would remain within the scope thereof.

It will also be understood that this invention was only described and represented in preferred forms of embodiment and that equivalent parts can be substituted for its constituents without departing from its scope as defined in the appended claims.

We claim:

1. A mechanical release device especially applied to the displaying of solar panels for a satellite, when they are stored between two members secured edge to edge to one another, said device comprising:
    a motive mechanism;
    at least one bonding element disposed on the lip of each of said edges of said members;
    at least one flexible junction element applied to said bonding elements;
    an element for automatically progressively raising said flexible element under the action of said motive mechanism;
    a container for said solar panels, connected to said satellite and carrying a hinge on the one side and at least one of said housing elements on the other side on the outer edge;
    a cover hingedly mounted to said hinge on the one side, and on the other side carrying at least one of said bonding elements on the outer edge;
    a plurality of said flexible junction elements being applied thereon;
    a cable for coordination of all ends not applied thereto of said flexible elements and progressive raising elements;
    an electric cable cutter; said cable being to this end connected at one of its ends to said motive mechanism connected to said container and on its other end to another portion of said container, said electric cable cutter being disposed adjacent said other end; the arrangement of said elements being such that operation of said cable cutter provokes as soon as said cable is cut the simultaneous peeling of all said bonding elements thereby also causing mechanical release of said cover and said container, as soon as said flexible elements have come off.

2. A mechanical release device applied to displaying of solar panels for a satellite as in claim 1, wherein securement lugs are used for connecting said container to said satellite.

3. A mechanical release device applied to displaying of solar panels of satellites as in claim 1, wherein a plurality of cable guides maintain said cable after cutting thereof, the command of said cable cutter being an electric control signal.

4. A mechanical release device applied to the displaying of solar panels for satellites as in claim 1, wherein a bladder mechanically holds said solar panels folded within said container in the resting position before displaying thereof.

5. A mechanical release device applied to the displaying of solar panels for satellites as in claim 1, comprising two return pulleys and a spring, said spring providing supplementary tension on said connecting cable which is guided by said two return pulleys.

6. A mechanical release device specially applied to the displaying of solar panels for a satellite for releasing two members secured temporarily edge to edge to one another, said device comprising:
- a motive mechanism;
- at least one bonding element disposed on the lip of each of said edges of said members;
- at least one flexible junction element applied to said bonding elements;
- an element for automatically progressively raising said flexible element under the action of said motive mechanism, the arrangement of said elements being such that, upon operation of said motive mechanism, said flexible element produces the peeling off of said bonding elements, thereby causing complete release of said temporarily secured members, since said flexible element has totally come off;
- a flat member pulled by said motive mechanism which includes a spring;
- said progressive raising element of said flexible element being a rotary roll;
- said flat member having a fixed extremity and the cutting off of said fixed extremity of said flat member permitting the raising of said flexible junction element under the action of said spring.

* * * * *